Figure 1:
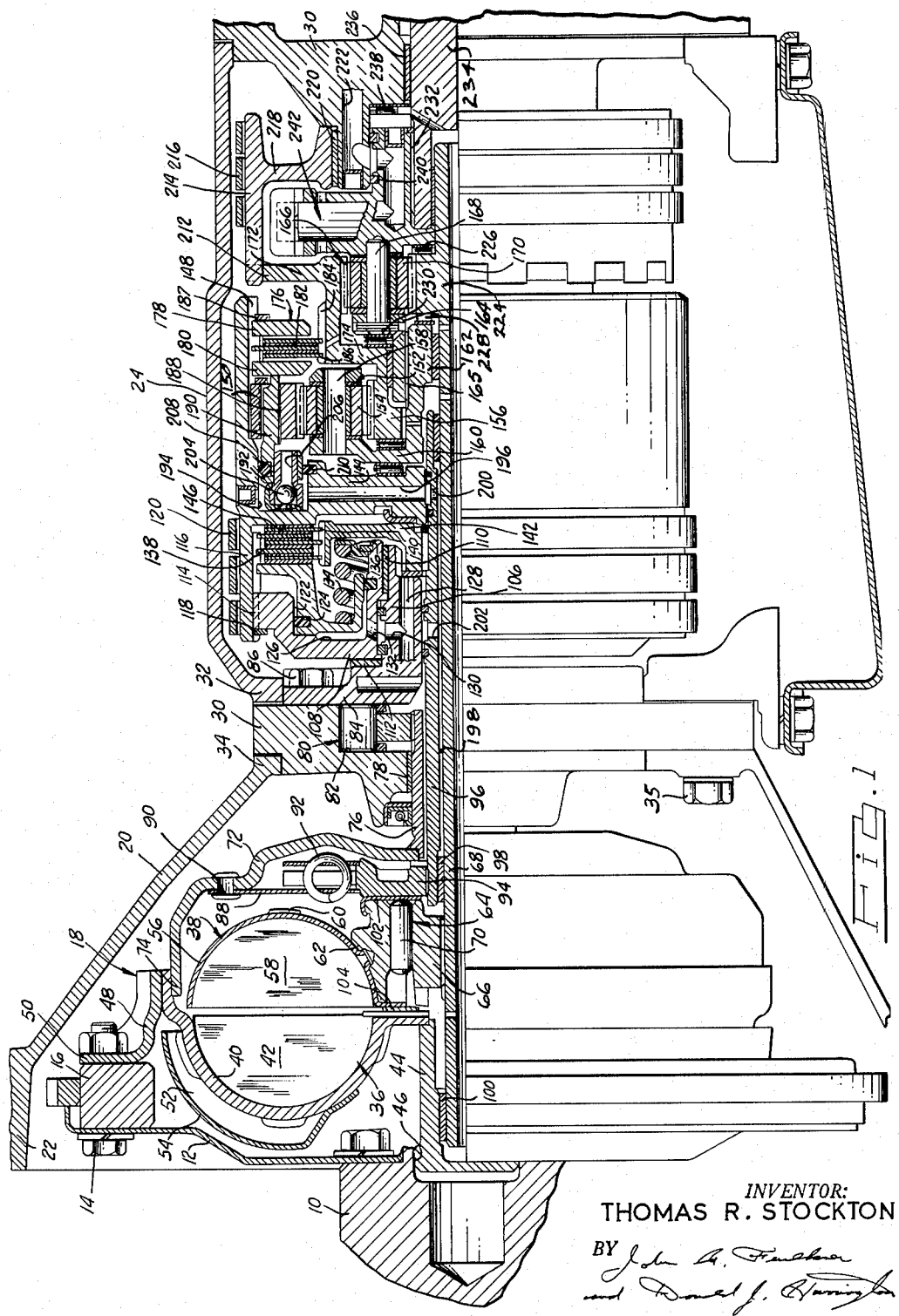

INVENTOR:
THOMAS R. STOCKTON
ATTORNEYS

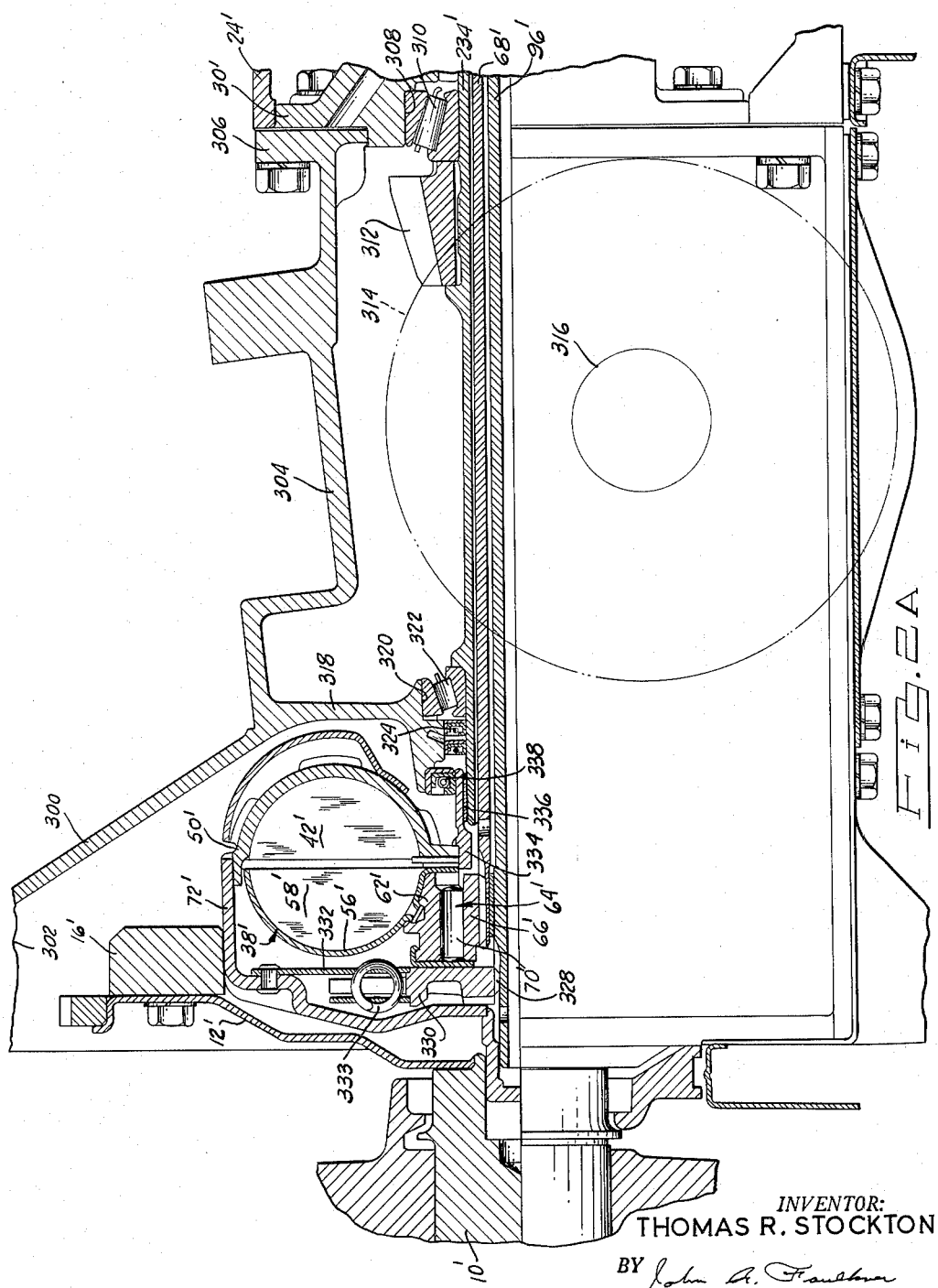

Nov. 16, 1965 T. R. STOCKTON 3,217,562
MULTIPLE SPEED RATIO POWER TRANSMISSION MECHANISM
WITH HYDROKINETIC UNIT AND TWO SIMPLE
PLANETARY GEAR UNITS
Filed July 1, 1963 3 Sheets-Sheet 3

INVENTOR:
THOMAS R. STOCKTON
BY
ATTORNEYS

United States Patent Office 3,217,562
Patented Nov. 16, 1965

3,217,562
MULTIPLE SPEED RATIO POWER TRANSMISSION MECHANISM WITH HYDROKINETIC UNIT AND TWO SIMPLE PLANETARY GEAR UNITS
Thomas R. Stockton, Northville, Mich., assignor to Ford Motor Company, Dearborn, Mich., a corporation of Delaware
Filed July 1, 1963, Ser. No. 291,801
10 Claims. (Cl. 74—677)

My invention relates generally to a multiple speed ratio power transmission mechanism capable of being used in automotive vehicle drive-lines, and more particularly to a power transmission mechanism having a hydrokinetic unit and two simple planetary gear sets wherein provision is made for rendering the hydrokinetic unit functional during operation in the lowest speed ratio and bypassing it during operation in an intermediate speed ratio. Provision is made also for establishing a split torque delivery path during cruising performance with a portion of the power delivered by the vehicle engine to the driven member being transferred through a hydrokinetic torque delivery path and the balance of the power being delivered through a wholly mechanical torque delivery path.

The provision of a power transmission mechanism of the type above set forth being a principal object of my invention, it is another object of my invention to provide a simplified fluid coupling transmission that includes two simple planetary gear sets wherein provision is made for controlling the relative motion of the elements of the gear sets by means of a novel clutch and brake arrangement to effect speed ratio changes.

It is a further object of my invention to provide a mechanism of the type set forth in the preceding object wherein provision is made for delivering power from a power input shaft to a concentrically aligned power output shaft wherein provision is made for establishing a nonsynchronous shift from an intermediate speed ratio to a direct drive ratio thereby eliminating timing problems normally associated with a corresponding speed ratio change in conventional mechanisms of this type.

It is a further object of my invention to provide a mechanism of the type set forth in the preceding objects and which may be adapted readily for use in a right angle drive transaxle with the power output shaft situated perpendicularly with respect to the center line of the power input shaft.

It is a further object of my invention to provide a multiple speed ratio power transmission mechanism having simple planetary gear units wherein improved clutch means are provided for connecting together two elements of the gear units for rotation in unison, said clutch means comprising a friction element and a fluid pressure operated servo with the friction element being situated on one side of the associated gear unit and pressure operated servo elements for the clutch structure being situated on the opposite side thereby reducing to a minimum the space requirements of the clutch and brake structure.

It is a further object of my invention to provide a transmission of the type above set forth wherein the overall axial dimensions as well as the transverse dimensions of the gear assembly are substantially less than the corresponding dimensions of a conventional transmission mechanism having a corresponding number of speeds and a corresponding capacity.

Figure 2B:
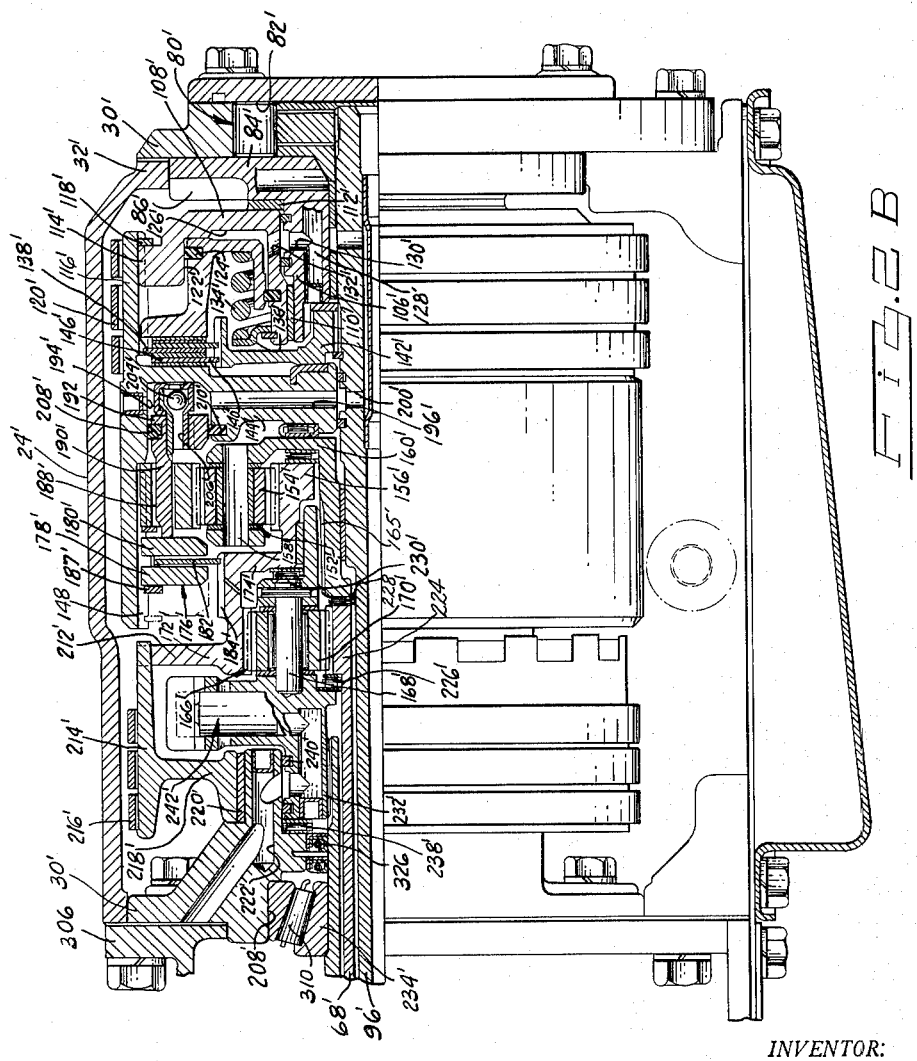

Further objects and features of my invention will become apparent from the following description and from the accompanying drawings, wherein:

FIGURE 1 is a longitudinal cross sectional view of a first embodiment of my invention, and FIGURES 2A and 2B show a transaxle arrangement embodying the features of my invention.

Referring first to FIGURE 1, numeral 10 designates generally a portion of a crankshaft for an internal combustion vehicle engine that may be bolted to the inner periphery of a drive plate 12, the periphery of the plate 12 being secured by bolts 14 to a peripheral ring 16 for a hydrokinetic fluid coupling designated generally by reference character 18. The coupling 18 is situated within a coupling housing 20 that may be bolted at its periphery 22 to a vehicle engine block. A main transmission housing, shown at 24, encloses the gear elements and the clutch and brake structure which will be described subsequently.

A tailshaft extension housing 26 is bolted by means of bolts 28 to an end plate 30 which covers the rear end of the housing 24. The plate 30 in turn is secured at its periphery to the end of housing 14, the bolts 28 also providing this connection.

The juncture of the housing 20 and the housing 24 is formed by a separating wall 30. The periphery 32 of the housing 24 and the periphery 34 of the housing 20 are secured to the periphery of wall 30. Suitable bolts 35 may be provided for this purpose.

The fluid coupling 18 includes a fluid coupling impeller 36 and a cooperating turbine 38 which are situated in toroidal fluid flow relationship in known fashion. The impeller 36 includes a shell 40 which is toroidal in shape and which receives impeller blades 42. The hub of shell 40 is welded or otherwise secured to a supporting hub shaft 44 which is received within a pilot opening 46 formed in the engine crankshaft. An impeller drive member 48 is welded or otherwise secured to the outer periphery of the shell 40. It is flanged at 50 to accommodate bolts 14 thereby providing a driving connection between the shell 40 and the drive plate 12.

If desired, a series of radially disposed cooling vanes 52 can be secured to the outer surface of the shell 40. These blades may be shrouded by a shroud 54 so that a flow of cooling air can be transferred in a radially outward direction across the outer surface of the shell 40. Suitable inlet and exhaust passages for the cooling air can be provided in known fashion.

The impeller 38 includes a shroud 56 within which are disposed turbine blades 58. These blades define radial flow passages which communicate with corresponding passages of the impeller blades 42. Blades 58 can be secured to the shroud 56 by providing slots in the shroud 56 through which tabs 60 are received. These tabs can be deformed tangentially to establish a locked connection between the shroud and the blades.

A turbine hub is shown at 62. It forms an outer race for an overrunning coupling 64. The coupling includes also an inner race 66 which is splined to a turbine shaft 68. Overrunning coupling elements in the form of rollers 70 are situated between the races to establish a one-way driving connection between the turbine 38 and the shaft 68. One of the races can be cammed so that a camming action with the rollers 70 will be established. Free-wheeling motion of the turbine 38 with respect to the shaft 68 in a backward direction can be accommodated by the overrunning coupling 64.

The impeller shell includes also a second shell part 72 which is welded or otherwise secured at its periphery 74 to the outer periphery of the shell 40.

The inner margin or part 72 is secured by welding to a hub shaft 76 and is journaled by bushing 78 within a cooperating opening formed in the wall 30. Shaft 76 is keyed or splined to a driving rotor of a positive displacement pump generally identified by reference character 80. This pump, which forms a part of an automatic clutch and brake control system, is received within a pump housing 82 formed in the wall 30. A pump closure plate 84 is bolted by bolts 86 to the wall 30.

A drive plate 88 is secured by rivets 90 to the interior of the part 72. A spring damper construction 92 is provided for establishing a yieldable connection between plate 88 and a drive hub 94. The hub 94 in turn is splined to a power delivery shaft 96 which extends concentrically through shaft 76 in surrounding relationship with respect to shaft 68. A bearing support in the form of a bushing 98 is situated between shafts 68 and 96. Another bushing 100 is provided as shown between shaft 68 and shaft 44.

A thrust washer 102 is situated between the races for the overrunning coupling 64 and the hub 94. Another thrust washer 104 is situated between the inner periphery of the shell 40 and the hub of turbine 38.

Plate 84 includes an axial sleeve extension 106 which provides a support for a clutch drum 108. A bushing 110 is disposed between drum 108 and extension 106. A thrust washer 112 is located between plate 84 and the drum 108 to accommodate axial thrust.

The drum member is splined at 114 to a second drum member 116. The members 108 and 116 are held axially fast by snap ring 118. A reverse brake band 120 is disposed around member 116 and is adapted to be applied selectively to anchor member 116. A suitable fluid pressure operated servo of known construction can be used for applying and releasing the band 120.

Member 108 defines an annular cylinder 122 within which is positioned an annular piston 124. The cylinder and piston cooperate to define a fluid pressure chamber 126 that is in fluid communication with a pressure feed passage 128 formed in part in extension 106. This communication is established by radial ports 130 and a port 132 which is located in the member 108. The pump 80 acts as fluid pressure source for a control system not shown, which in turn distributes pump pressure to the passage 128 in response to controlling movements of valve elements within the valve system. A piston return spring 134 acts against piston 124 and is anchored upon a spring seat 136. This seat in turn is held axially fast with respect to member 108 by a snap ring.

Externally splined clutch discs 138 are splined to internal splines formed on the member 116. Internally splined clutch discs 140 are situated in interdigital relationship with respect to discs 138 and are splined to an externally splined clutch member 142. This clutch member in turn is splined to shaft 96.

A supporting wall 144 is formed integrally with or connected to member 116 and provides a friction surface 146 which acts as a reaction point for the pressure force applied to the piston 124. As pressure is admitted to the chamber 126, piston 124 compresses the clutch discs 138 and 140 to establish a frictional driving connection between shaft 96 and member 116.

Member 116 is splined also at 148. A ring gear 150 for a first planetary gear unit 152 is externally splined to establish a driving connection with the internal splines of member 116. Gear 150 meshes with planet pinions 154 which in turn mesh with a sun gear 156.

Pinions 154 are journaled for rotation upon pinion shafts 158 which in turn are supported by a carrier 160. This carrier, the sun gear 156, pinions 154 and ring gear 150 define the elements of the gear unit 152.

Carrier 160 includes an extension 162 which is splined at 164 to a second carrier 165 of a second planetary gear unit 166. This carrier supports pinion shafts 168 upon which are journaled planetary pinions 170. Pinions 170 drivably mesh with a ring gear 172 which in turn is connected drivably to a drive member 174 and with the sun gear 156.

A high speed clutch is generally identified by reference character 176. It includes a reaction disc 178 and a pressure plate 180, each of which is splined to the internal splines 148 of the member 116. An externally splined clutch disc 182 also is carried by the member 116 intermediate the pressure plate 180 and the reaction disc 178.

Member 174 is splined at 184 to establish a driving connection with internally splined friction discs 186. These are situated on either side of the disc 182. A snap ring 187 holds the clutch assembly axially fast with respect to the member 116.

Ring gear 150 is formed with a series of openings 188 through which piston extensions 190 are received. These extensions engage pressure plate 180.

Extensions 190 form a part of an annular piston 192 which is slidably received within an annular cylinder 194 formed in the support 144. The pistons and cylinder cooperate to define a pressure chamber which may be pressurized by distributing fluid pressure through a clutch feed passage 196 formed in the support 144. This passage in turn communicates with an annular passage 198 defined by the concentric shafts 96 and 68. A suitable port 200 provides communication between passage 196 and passage 198. Passage 198 is in fluid communication also with a pressure distributor manifold that is defined in part by the extension 106, a suitable port 202 being provided for this purpose.

As pressure is admitted to the working chamber defined by cylinder 194 and piston 192, the extension 190 urges the pressure plate 180 in a right hand direction to establish a frictional driving connection between member 116 and member 174. When the working chamber is pressurized, a ball check valve 204 is urged against a cooperating valve seat thereby blocking an exhaust passage 206. As soon as pressure is relieved from the passage 196, however, the ball check valve 204 is urged off from its seat under the influence of centrifugal force thereby establishing direct communication between passage 196 and the exhaust region. This prevents a centrifugal clutch pressure build-up, which would delay the release of the clutch 176, permits a rapid clutch release upon a down-shift to an under-drive ratio.

The piston 192 can be sealed within the cylinder 194 by means of a circular O-ring 208 and a sealing ring 210.

Member 174 is connected directly to ring gear 172. It includes a radial extension 212 which is keyed or otherwise secured to a brake drum 214. A low speed and intermediate speed brake band 216 surrounds the drum 214 and may be applied and released selectively by means of a conventional fluid pressure operated servo. Drum 214 includes a supporting web 218 which is journaled by means of bushing 220 upon an extension 222 of the wall 30.

A sun gear 224 forms a part of gear unit 166 and is connected directly to shaft 68. Thrust bearings 226 and 228 are situated on either side of the sun gear 224, the bearing 226 accommodating thrust between the sun gear 224 and the carrier 164. Bearing 228 accommodates thrust between sun gear 224 and extension 162. A thrust bearing is situated also between member 174 and carrier 164 as shown at 230.

Carrier 164 is drivably connected by means of splines 232 to a driven shaft 234 disposed within the tailshaft extension housing 26. This shaft 234 is journaled by bushing 236 within a cooperating opening formed in the wall 30. A thrust bearing 238 is situated between the housing 30 and an extension 240 formed by the carrier. This extension cooperates with the inner peripheral surface of the housing extension 222 and defines a fluid pressure distributor manifold that forms a part of the automatic control valve circuit for controlling distribution of pressure to the clutches and brakes.

A fluid pressure governor assembly 242, which is connected to or formed integrally with carrier 164, is located within the brake drum 214. It thus is accommodated without requiring any additional space within the transmission housing.

During low speed ratio operation of the structure of FIGURE 1, brake band 216 is applied. Engine torque that is delivered to the impeller 36 of the fluid coupling causes torque to be developed by the turbine 38. Turbine torque then is transmitted through overrunning coupling 64 to the shaft 68 and hence to the sun gear 224. Ring gear 172 functions as a reaction member since it is anchored by the brake band 216. The carrier 164 then is driven at a reduced speed ratio and this, of course, causes the driven shaft 234 to be driven at the same speed. The fluid coupling accommodates the entire engine torque which results in a smooth application of driving torque to the driven member during acceleration from a standing start.

To establish intermediate speed ratio operation, it merely is necessary to apply the multiple disc clutch assembly shown at 138 and 140. The brake band 216 remains applied. Under these conditions, the entire engine torque is transmitted through the drive plate 88 to the shaft 96. Torque then is distributed through the forward clutch to the ring gear 150. Since the sun gear 156 is held stationary by the brake band 216, it functions as a reaction member and the carrier 160 is driven at a reduced speed ratio. This carrier, however, is connected directly to carrier 164 and driven shaft 234. The torque delivery path thus is a solid mechanical drive during intermediate speed ratio operation and the coupling is rendered ineffective. This provides a maximum degree of operating efficiency as well as a positive slip-free driving connection for acceleration purposes after the vehicle is under way following a standing start.

To establish high speed ratio operation, the forward clutch remains applied and the rear brake band 216 is released. The rear clutch 176 is applied in synchronism with the release of the band 216. The gear elements thus are locked together for rotation in unison at a one-to-one speed ratio. The driving torque is distributed from the engine through the drive plate 88 and through shaft 96 to the forward clutch. It then is distributed through the forward gear unit to the common carriers and the power output shaft. Operation in this speed ratio thus is characterized by a high degree of efficiency.

It will be apparent that the shift from the lowest speed ratio to the intermediate under-drive ratio occurs simply by engaging a friction clutch. This causes the sun gear 224 to overrun the turbine shaft 68 since it is forced to rotate at an increased speed due to the change in the torque distribtuion to the gear units. The shift from the lowest speed ratio to the intermediate ratio thus is a nonsychronous shift that does not require timing in the application and release of friction elements.

To establish reverse drive operation, it merely is necessary to release the two friction clutches and the rear band 216 and apply the reverse brake band 120. This anchors the forward ring gear 150. The fluid coupling accommodates the entire engine torque during reverse drive operation and the coupling turbine thus is caused to drive the sun gear 224. The overrunning coupling 64, of course, forms a part of the connection between the turbine and the sun gear. This causes the ring gear 172 to rotate in a reverse direction which in turn causes sun gear 156 to rotate in unison with it. Ring gear 150 acts as a reaction member for the front gear unit, and carrying 160 thus is driven in a reverse direction by reason of the reverse driving sun gear torque. This torque is greater than the forward driving torque imparted to the carrier 164 by the sun gear 224 and the resultant carrier torque thus is in a reverse driving direction. This, of course, powers driven shaft 234 in a reverse direction.

The mechanism of FIGURE 1 can be adapted readily for use as a transaxle or cross-drive. This is illustrated in FIGURE 2. The housing that encloses the gear elements and the gear elements themselves, as shown in FIGURE 1, can be reversed, end for end, and used in the arrangement of the type shown in FIGURE 2. It is merely necessary to use a different end plate corresponding to plate 30 and employ a housing structure that will accommodate a right angle bevel gear drive as well as a coupling. For purposes of this description, the gear elements and the main housing of the mechanism of FIGURE 2 have been identified with reference characters that correspond to counterpart elements of the structure of FIGURE 1, although primed notations have been added.

In the mechanism of FIGURES 2A and 2B, an impeller housing, shown at 300, may be connected at its periphery 302 to the engine block of an internal combustion vehicle engine. Housing 300 is formed integrally with a bevel gear drive housing 304 which in turn is flanged at 306 to facilitate a bolted connection with the end plate 30' and the end of main housing 24'. Housing 304 is formed with a bearing recess 308 within which is situated a tapered roller bearing 310. This supports a bevel drive gear 312 of a right angle drive assembly. This gear 312 meshes with a bevel ring gear schematically designated by reference character 314. The ring gear in turn is drivably connected to right angle powder output axle shafts 316 that may be journaled in a suitable fashion within housing 304. In a vehicle drive line installation, ring gear 314 would form a part of the differential carrier for a differential mechanism. Each axle shaft would be drivably connected to a differential side gear that meshes with differential gears carried by the carrier. The axle shafts in turn would be connected to the traction wheels through a suitable drive shaft structure. This arrangement is adapted particularly to be used with a front wheel drive vehicle.

Drive pinion 312 is splined to power output shaft 234' which in this embodiment is in the form of a sleeve that surrounds turbine shaft 68'. A supporting wall 318 is provided at an axially spaced location with respect to pinion 312. It is formed with a bearing recess 320 which receives another tapered roller bearing 322 which supports also the shaft 234'. A fluid seal 324 is provided at the left hand side of the housing 304 adjacent bearing 322 and a companion seal 326 is disposed adjacent bearing 310.

Shaft 96' extends concentrically through shafts 234' and 68'. It is splined at 328 to a drive hub 330. This hub in turn is connected to a drive plate 332 by means of a yieldable damper assembly 333. The periphery of drive plate 332 is riveted as shown to a shell part 72'. It is welded or otherwise secured at its periphery to the periphery of a second impeller shell part 50'. This shell part 50' is formed with a generally toroidal shape and receives impeller blades 42'. The inner periphery of shell part 50' is welded to support sleeve shaft 334 which is journaled by means of a bushing 336 on the end of shaft 234'. A suitable fluid seal 338 is provided at this point as indicated.

Disposed in torodial fluid flow relationship with respect to the bladed impeller blades 42' is a turbine 38' which includes turbine blades 58' situated within a turbine shroud 56'. This shroud includes a hub 62' which forms an outer race for overrunning coupling 64'. An inner coupling race is shown at 66' and disposed between the races is a series of rollers 70'.

The mechanism of FIGURE 2 operates substantially in the same fashion as the mechanism of FIGURE 1. Turbine torque, during low speed ratio operation, is delivered through overrunning coupling 64' and through the turbine shaft 68' to the power input sun gear element of the gear units. As in the previous embodiment, the torque delivery path includes a hydrokinetic coupling which transmits the entire engine torque.

The intermediate speed ratio, as in the embodiment of FIGURE 1, is a solid drive and the fluid coupling is rendered inoperative. Also, as in the embodiment of FIGURE 1, high speed direct drive operation is a split torque drive.

Engine torque is delivered to the impeller shell part 72' through a drive plate 12' which is connected at its inner periphery to the crankshaft 10'. An annular ring 16', which provides a so called fly-wheel effect, is bolted to the outer periphery of the drive plate 12' and secured in fixed fashion to the outer periphery of the shell part 72'.

Having thus described preferred embodiments of my invention, what I claim and desire to secure by United States Letters Patent is:

1. A power transmission mechanism adapted to deliver driving torque from a driving member to a driven member comprising a hydrokinetic unit having a bladed impeller and a bladed turbine disposed in toroidal fluid flow relationship, said impeller being connected to said driving member, a pair of simple planetary gear units, each gear unit comprising a ring gear, a sun gear, a carrier and planet gears rotatably mounted upon said carrier in meshing engagement with said sun and ring gears, the carrier of each unit being connected directly to said driven member, an overruning coupling connection between said turbine and the sun gear of a first of said gear units, a selectively engageable friction clutch means forming in part a direct mechanical connection between said driving member and the ring gear of the second of said gear units, the sun gear of the second unit being connected to the ring gear of the first unit, a slectively engageable friction brake means for anchoring the ring gear of said first unit and the sun gear of said second unit during low speed ratio operation and intermediate speed ratio operation, and second selectively engageable clutch means for connecting together two elements of said second gear unit to establish a direct drive ratio through said mechanism.

2. A power transmission mechanism capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said carriers being connected together in direct driving relationship with respect to said driven shaft, and overrunning coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adapted to deliver torque directly from said driving member to the ring gear of said second gear unit during intermediate speed ratio operation, a second selectively engageable clutch means for drivably connecting the ring gear of said second gear unit and the ring gear of said first gear unit during direct drive operation, and a reverse brake means for anchoring the ring gear of said second gear unit during reverse drive operation.

3. A power transmission mechanism adapted to deliver driving torque from a driving member to a driven member comprising a hydrokinetic unit having a bladed impeller and a bladed turbine disposed in toroidal fluid flow relationship, said impeller being connected to said driving member, a pair of simple planetary gear units, each gear unit comprising a ring gear, a sun gear, a carrier and planet gears rotatably mounted upon said carrier in meshing engagement with said sun and ring gears, the carrier of each unit being connected directly to said driven member, an overruning coupling connection between said turbine and the sun gear of the first of said gear units, a selectively engageable friction clutch means forming in part a direct mechanical connection between said driving member and the ring gear of the second of said gear units, the sun gear of the second unit being connected to the ring gear of said first unit, a selectively engageable friction brake means for anchoring the ring gear of the first unit and the sun gear of the second unit during low speed ratio operation and intermediate speed ratio operation, second selectively engageable clutch means for connecting together two elements of said second gear unit to establish a direct drive ratio through said mechanism, said second selectively engageable clutch means comprising friction elements situated on one side of the second gear unit and a fluid pressure operated servo disposed on the opposite side thereof in axially spaced relationship with respect to said friction elements, said servo comprising a rotatable annular cylinder and a piston slidably received within said cylinder, an extension formed on said piston, and apertures formed in portions of the second gear unit for receiving said piston extensions whereby the fluid pressure force applied to said piston may be transmitted to said friction elements to cause engagement of said second clutch means.

4. A power transmission mechanism capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said carriers being connected together in direct driving relationship with respect to said driven shaft, an over-running coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adapted to deliver torque directly from said driving member to the ring gear of said second gear unit during intermediate speed ratio operation, a second selectively engageable clutch means for drivably connecting the ring gear of said second gear unit and the ring gear of said first gear unit during direct drive operation, a reverse brake means for anchoring the ring gear of said second gear unit during reverse drive operation, said second selectively engageable clutch means comprising friction elements situated on one side of said second gear unit and a fluid pressure operated servo disposed on the opposite side of said second gear unit in axially spaced relationship with respect to said friction elements, said servo comprising a rotatable annular cylinder and a piston slidably received within said cylinder, an extension formed on said piston and apertures formed in portions of said second gear unit for receiving said piston extensions whereby fluid pressure force applied to said piston may be transmitted to said friction elements to cause engagement of said second clutch means.

5. A power transmission mechanism capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said carriers being connected together in direct driving relationship with respect to said driven shaft, an overrunning coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adapted to deliver torque directly from said driving member to the ring gear of said second gear unit during intermediate speed ratio operation, a second selectively engageable clutch means including an actuating pressure operated servo for drivably connecting the ring gear of said second gear unit and the ring gear of said first gear unit during direct drive operation, said first clutch means and said second clutch means comprising a common drum rotatably supported upon a stationary portion of said mechanism, separate portions of said drum defining separate rotatable annular cylinders, a reverse brake band surrounding said common portion and adapted to anchor the same during reverse drive operation, the ring gear of said second unit being connected to said common portion, a fluid pressure operated piston disposed in each cylinder, each clutch assembly including friction elements drivably connected to the interior of said common portion in the line of axial movement of their respective pistons, a friction element for said second clutch means being situated on one side of said second gear unit and its associated servo being situated on the opposite side thereof, apertures formed in portions of said second gear unit, and a piston extension formed on the piston for said second clutch means and received through said apertures whereby a clutch actuating force can be applied to the friction elements of said second clutch means upon introduction of fluid pressure to its associated servo.

6. A power transmission mechanism capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said carriers being connected together in direct driving relationship with respect to said driven shaft, an overrunning coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adapted to deliver torque directly from said driving member to the ring gear of said second gear unit during intermediate speed ratio operation, a second selectively engageable clutch means for drivably connecting the ring gear of said second gear unit and the ring gear of said first gear unit during direct drive operation, a reverse brake means for anchoring the ring gear of said second gear unit during reverse drive operation, said first mentioned selectively engageable brake means comprising a rotatable brake durm supported by a stationary portion of said mechanism, and a fluid pressure governor connected drivably to the carrier of said first gear unit and disposed wholly within said brake drum, said governor being in fluid communication with a fluid pressure distributor manifold rotatably supported within a stationary portion of said mechanism.

7. A power transmission mechanism adapted to deliver driving torque from a driving member to a driven member comprising a hydrokinetic unit having a bladed impeller and a bladed turbine disposed in toroidal fluid flow relationship, said impeller being connected to said driving member, a pair of simple planetary gear units, each gear unit comprising a ring gear, a sun gear, a carrier and planet gear rotatably mounted upon said carrier in meshing engagement with said sun and ring gears, the carrier of each unit being connected directly to said driven member, an overrunning coupling connection between said turbine and the sun gear of the first of said gear units, a selectively engageable friction clutch means forming in part a direct mechanical connection between said driving member and the ring gear of the second of said gear units, the sun gear of the second unit being connected to the ring gear of the first unit, a selectively engageable friction brake means for anchoring the ring gear of the first unit and the sun gear of the second unit during low speed ratio operation and intermediate speed ratio operation, second selectively engageable clutch means for connecting together two elements of said second gear unit to establish a direct drive ratio through said mechanism with a portion of the torque being delivered entirely mechanically through one power flow path and the balance of the torque being delivered hydrokinetically through said coupling, said mechanism being disposed within a transmission housing having axially spaced portions, the hydrokinetic unit being disposed within one housing portion and the gear units being disposed in the other housing portion.

8. A power transmission mechanism capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said gears being connected together in direct driving relationship with respect to said driven shaft, an overrunning coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adpted to deliver torque directly from said driving member to the ring gear of said second gear unit during intermediate speed ratio operation, a second selectively engageable clutch means for drivably connecting the ring gear of said second gear unit and the ring gear of said first gear unit during direct drive operation, and a reverse brake means for anchoring the ring gear of said second gear unit during reverse drive operation, said mechanism being disposed within a transmission housing having axially spaced portions, said hydrokinetic unit being disposed within one housing portion and said gear units being disposed in the other housing portion.

9. A power transmission mechanism adapted to deliver driving torque from a driving member to a driven member comprising a hydrokinetic unit having a bladed impeller and a bladed turbine disposed in toroidal fluid flow relationship, said impeller being connected to said driving member, a pair of simple planetary gear units, each gear unit comprising a ring gear, a sun gear, a carrier and planet gears rotatably mounted upon said carrier in meshing engagement with said sun and ring gears, the carrier of each unit being connected directly to said driven member, an overrunning coupling connection between said turbine and the sun gear of the first of said gear units, a selectively engageable friction clutch means forming in part a direct mechanical connection between said driving member and the ring gear of the second of said gear units, the sun gear of said second unit being connected to the ring gear of said first unit, a selectively engageable friction brake means for anchoring the ring gear of said first unit and the sun gear of said second unit during low speed ratio operation and intermediate speed ratio operation, second selectively engageable clutch means for connecting together two elements of said second gear unit to establish a direct drive ratio through said mechanism, a transmission housing for enclosing said mechanism comprising three portions disposed in axially spaced relationship, the first housing portion surrounding said fluid coupling, the second housing portion surrounding said gear units and the third housing portion disposed intermediate said first and second portions, a bevel pinion drivably connected to said driven member, and a right angle drive mechanism disposed within said intermediate housing portion in geared relationship with respect to said driving pinion.

10. A power transmission capable of delivering driving power from a driving member to a driven member at various speed ratios comprising a hydrokinetic fluid coupling having an impeller and a turbine situated in a common torus circuit in fluid flow relationship, said impeller being connected to said driving member, a pair of simple planetary gear units, each gear unit comprising a sun gear, a ring gear, a planet carrier and planet gears rotatably mounted upon said carrier in meshing engagement with said sun and ring gears, said gears being connected together in direct relationship with respect to said driven shaft, an overrunning coupling connection between said turbine and the sun gear of a first of said gear units whereby turbine torque can be delivered to said first gear unit in one direction only, a first selectively engageable friction clutch means for establishing a direct driving mechanical connection between the ring gear of the second of said gear units and said driving member, selectively engageable friction brake means for anchoring the ring gear of said first gear unit and the sun gear of said second gear unit during low speed ratio operation and intermediate speed ratio operation, said first selectively engageable friction clutch means being adapted to deliver torque directly from said driving member to the ring gear of said second gear unit during intermediate speed ratio operation, a second selectively engageable clutch means for drivably connecting the ring gear of said second gear unit and the ring gear of said first gear unit during direct drive operation, and a reverse brake means for anchoring the ring gear of said second gear unit during reverse drive operation, a transmission housing for enclosing said mechanism comprising three portions disposed in axially spaced relationship, the first housing portion surrounding said fluid coupling, the second housing portion surrounding said gear units and the third portion being disposed intermediate said first and second portions, a driving bevel pinion drivably connected to said driven member, and a right angle drive mechanism disposed within said intermediate housing portion in geared relationship with respect to said driving pinion.

References Cited by the Examiner
UNITED STATES PATENTS

| | | | |
|---|---|---|---|
| 2,749,777 | 6/1956 | Simpson | 74—688 X |
| 2,755,688 | 7/1956 | Swennes | 74—688 X |

DON A. WAITE, *Primary Examiner.*